United States Patent [19]

Lever

[11] 4,082,322
[45] Apr. 4, 1978

[54] CHIMNEY CONSTRUCTION FOR HEATING FIXTURES

[75] Inventor: Paul H. Lever, Fallbrook, Calif.

[73] Assignee: Fireplace Corporation of America, Walled Lake, Mich.

[21] Appl. No.: 612,273

[22] Filed: Sep. 11, 1975

[51] Int. Cl.² .......................... F16L 39/00; F24B 1/18
[52] U.S. Cl. ............................... 285/133 R; 29/526 R; 98/60; 126/121; 285/424; 285/DIG. 22
[58] Field of Search ............... 285/237, 424, DIG. 22, 285/138, 133 R; 126/121; 98/60

[56] References Cited

U.S. PATENT DOCUMENTS

| 69,506 | 10/1867 | Stine | 285/424 X |
|---|---|---|---|
| 314,259 | 3/1885 | McCutchen | 285/383 X |
| 1,811,277 | 6/1931 | Mosley | 285/237 X |
| 2,189,159 | 2/1940 | Anschicks | 285/424 X |
| 2,330,769 | 9/1943 | Wichner | 285/424 X |
| 2,498,753 | 2/1950 | Deitsch | 285/424 X |
| 2,650,112 | 8/1953 | Kinkead | 285/424 X |
| 2,894,537 | 7/1959 | Carr | 285/133 R |
| 3,170,544 | 2/1965 | Kinkead et al. | 285/424 X |
| 3,226,135 | 12/1965 | Epstein | 285/424 X |
| 3,512,805 | 5/1970 | Glatz | 285/424 X |
| 3,797,865 | 3/1974 | Ballentine | 285/237 X |
| 4,010,728 | 3/1977 | Hempel et al. | 126/121 X |

FOREIGN PATENT DOCUMENTS

| 2,002,740 | 8/1971 | Germany | 285/237 |

Primary Examiner—Thomas F. Callaghan
Attorney, Agent, or Firm—Krass & Young

[57] ABSTRACT

A metal chimney construction for use with heating fixtures such as prefabricated fireplaces. The chimney is constructed from pipe sections joined together by an "inside-outside" coupling ring. The ring is formed from thin-gage sheet metal, shaped and seamed to form an integral cylindrical body. One end is dimensioned to receive the end of a first adjoining pipe section therein, the other end is dimensioned to receive the end of a second adjoining pipe section thereover. A modified coupling for coaxial, multiple-pipe installations is also disclosed.

4 Claims, 4 Drawing Figures

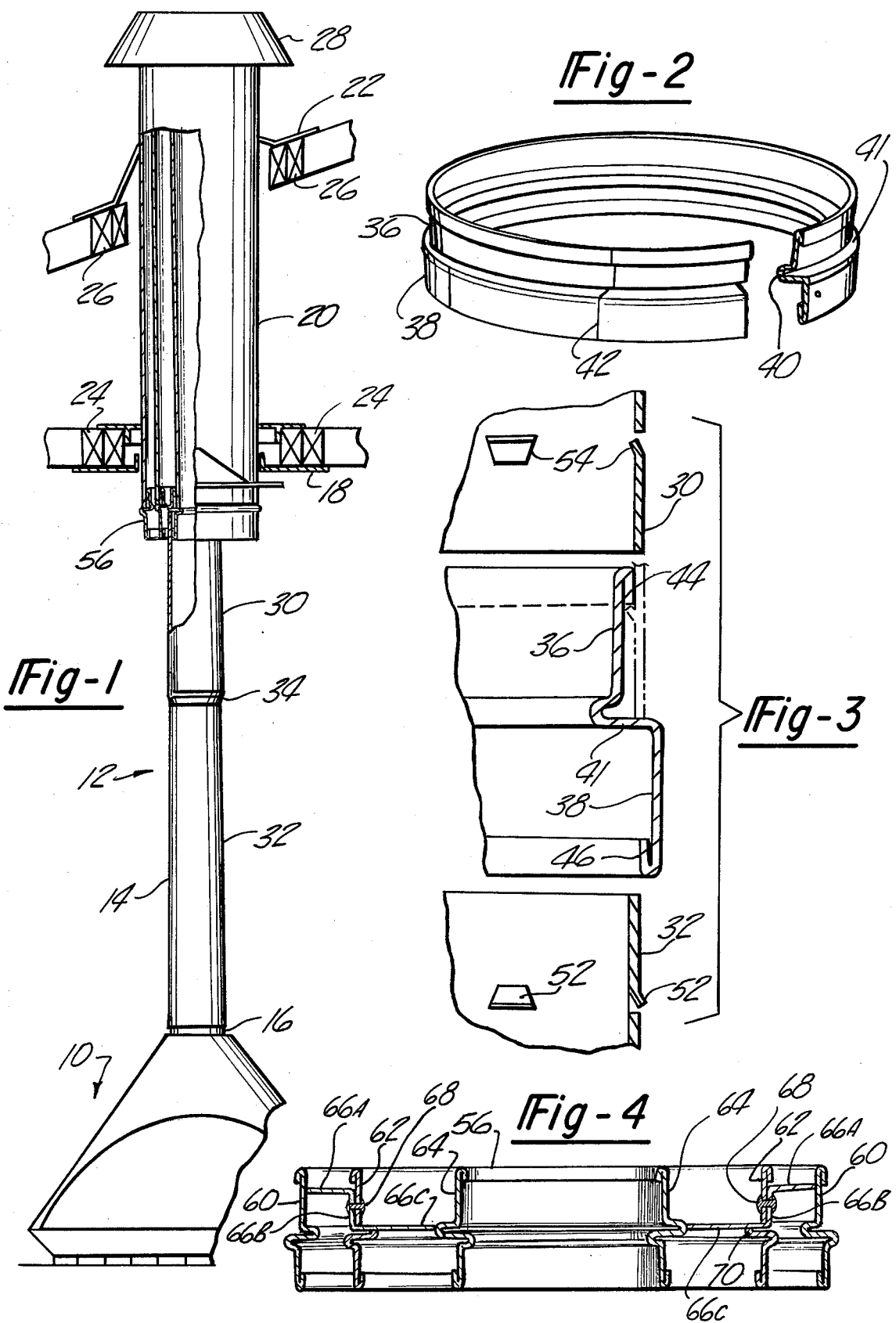

CHIMNEY CONSTRUCTION FOR HEATING FIXTURES

INTRODUCTION

This invention relates to the construction of chimneys for heating fixtures and particularly to a coupling ring used to assemble sections of such chimneys.

BACKGROUND OF THE INVENTION

Prefabricated fireplaces, oil stoves, wood burners, gas burners and other facilities for producing heat by combustion must be equipped with ventilating pipes which channel the flow of exhaust gases away from the combustion area. The installation of such pipes often involves a sectioning and coupling operation to match and join pipe lengths of the same or different diameter.

It is difficult to make couplings in the field since, according to prior art techniques, the cut sections require end-forming operations to ensure proper interconnection. Such end-forming operations are difficult to perform in the field on even short pipe lengths. In fact, end-forming operations are difficult to perform in a factory when the pipe lenghts are great.

Hence, it is desirable to provide a coupling which may be used to join pipe sections having substantially plain, square-cut ends thereby to eliminate the need for pipe length end forming and welding operations both in the field and in the factory.

BRIEF SUMMARY OF THE INVENTION

The subject invention provides means to facilitate the installation of metal flues and chimneys by providing a secure, leak-proof coupling between plain-ended pipe sections substantially as cut in the field or factory.

In general, this is accomplished by providing a prefabricated coupling ring of thin-gage metal designed to fit over one pipe end and within the other pipe end. In addition, the coupling is provided with a roll-formed or central swaged discontinuity or flange which acts as a common stop to both pipe ends after installation.

In the preferred form, the coupling ring of the present invention may have the opposite ends thereof reversely hemmed; i.e., one hem is internal and the other is external. The hems operated in conjunction with tabs which may be easily struck in the ends of the pipe sections to be joined to prevent disassembly of the joint.

As hereinafter described in detail, the coupling ring of the present invention may be fabricated in coaxial, multiple ring assemblies to facilitate the installation of coaxial pipe flues and chimneys.

Various other features and advantages of the invention will be apparent from a reading of the following description of illustrative embodiments.

BRIEF DESCRIPTION OF THE DRAWINGS

FIG. 1 is an elevational view of a heating system installed using the present invention;

FIG. 2 is a perspective view of a single pipe coupling in the preferred embodiment;

FIG. 3 is a sectional view of a single pipe joint exploded along the longitudinal axis of symmetry; and FIG. 4 is a sectional view of a coupling for treble pipe chimneys.

DETAILED DESCRIPTION OF THE SPECIFIC EMBODIMENT

In FIG. 1 a prefabricated metal fireplace 10 is ventilated by a chimney shown generally at 12. The chimney 12 comprises two basic portions; a single pipe portion 14 extending from the fireplace exhaust port 16 to the ceiling 18, and a treble pipe portion 20 extending from the ceiling 18 to the roof 22. The treble pipe portion 20 is used where the chimney 12 contacts or is in close proximity to structural members that may be kindled by the heat radiated by the hot gases within the chimney, e.g., ceiling joists 24 and roof rafters 26. Chimney 12 terminates in and is protected by raincap 28.

The single pipe portion 14 of chimney 12 is shown as being assembled from a plurality of pipe sections 30 and 32 joined by coupling 34.

FIG. 2 is a perspective view of the coupling 34. It is preferably formed from thin gage sheet metal and shaped into an annular or cylindrical configuration. The ends are joined by a seam 42. The surface of the coupling is formed to define first and second coaxial end segments 36 and 38. The end segments 36 and 38 are joined by a radial flange or step 41 that extends substantially normally between the segments. The union, of step 41 with end segment 36 further defines an inwardly directed circumferential groove 40. Groove 40 is in the nature of a corrugation to give the coupling 34 greater resistance to deformation. It is not required but may be formed in a rolling operation if desired. The outer ends of end segments 36 and 38 are oppositely turned or reversely looped to define hems 44 and 46. End segment 36 has an outwardly turned hem 44, and end segment 38 has in inwardly turned hem 46. The step 41 extends radially a distance such as to radially offset the hems 44 and 46 a distance equal to the chimney pipe section 30 thickness such that the end segments 36 and 38 are offset a distance equal to the combined thickness of the chimney section 30 and the reversely looped portion of each end segment 36 and 38 forming the hems 44 and 46.

The manufacture of the coupling 34 begins with the forming of an elongate band or section of thin-gage sheet methal. The opposed longitudinal sides of the band are then oppositely turned to define the hems 44 and 46. The step 41 may be formed in the hemmed band by various operations, two of which are swaging and roll-forming.

In the swaging process the hemmed band is bent into a cylindrical configuration and placed in a die having a collar externally supporting the lower half of the cylinder but leaving a clearance equal to the radial dimension of step 41 between the upper half of the band and the internal die surface. The upper portion of the cylinder encloses a plurality of spring-loaded, sector-shaped swaging dies. The dies are ordered in a circular configuration to fit within the inner circumference of the upper portion. The inner ends of the dies form a central opening which is tapered downwardly to receive a cam pin. When the pin is inserted into the opening, the dies are displaced radially to strike and increase the diameter of the upper portion of the band. The upper portion of the band now defines end segment 38, the lower portion defines end segment 36 and the junction of the end segments 36 and 38 defines radial step 41.

Alternatively, the hemmed band may be roll-formed to define the end segments 36 and 38, step 41 and groove 40. In this method the hemmed band is passed through rollers having peripheral surfaces of the appropriate shapes to define the aforementioned features.

The swaged or roll-formed band is secured in a cylindrical configuration by forming a seam 42 joining the end portions of the band. Seam 42 may either be a riveted or a lapped mechanical seam. In either case the end portions are interlocked and will not soften or open due to heat when in use.

As best shown in FIG. 3, the first end segment 36 has an outside diameter substantially the same as the inside diameter of the pipe section which it engages. This allows pipe section 30 to be joined as a female member to segment 36. The second end segment 38 has an inside diameter substantially the same as the pipe section which it engages. This allows pipe section 32 to be joined as a male member to the end segment 38. Step 41 provides a positive stop for the ends of the pipe sections 30 and 32 when the sections are in engagement with the coupling 34.

To facilitate rapid interfitting between the coupling ring 34 and the adjoining pipe sections it may be desirable to have the outer end of end segment 36 flared slightly inwardly and the outer end of end segment 30 flared slightly outwardly. This involves end-forming operations, but is easily performed in the factory on the small and readily handled coupling ring 34.

In FIG. 3 the wall thicknesses of the members have been exaggerated to better illustrate their salient features. The end of segment 36 is turned over to form an outside hem 44 and the end of segment 38 is turned over to provide an inside hem 46. Pipe sections 30 and 32 have each formed therein a plurality of locking tabs, shown as 52 in section 32 and as 54 in section 30. The locking tabs 52 and 54 may be struck from the walls of the sections by a hand-held punch or by a hammer and small cold chisel. In pipe section 32 the tabs 52 protrude outwardly to cooperate with the inwardly turned hem 46 of end segment 38. In pipe section 30 the tabs 54 protrude inwardly to cooperate with the outwardly turned hem 44 of end segment 36. Tabs 52 and 54 are sufficiently flexural to allow the interfitting of section 30 over end segment 36 and section 32 within end segment 38. Tabs 54 are spaced longitudinally from the end of section 30 substantially the same distance as the distance between hem 44 and step 41; tabs 52 are spaced longitudinally from the end of section 32 substantially the same distance as the distance between hem 46 and step 41. In the course of assembly, when the trailing edge of tab 54 passes beyond hemmed end 44, pipe section 30 attains a locking relationship with the end segment 36. Similarly, when the trailing edge of tab 52 passes beyond hem 46, pipe section 32 attains a locking relationship with the end segment 38. With the members in this posture, convergent travel of pipe sections 30 and 32 is limited by step 41; and divergent travel is limited by the cooperation of tabs 52 and 54 with hems 46 and 44 respectively.

The coupling ring 34 possesses the further advantage of being able to be oriented in either of two alternative 180° opposing positions depending upon the application. If the pipe joint is to be exposed outside of the building, it is preferable to orient the male end segment 36 upwardly to create a joint impervious to the entry of rainwater. If condensation in the flue is a consideration, the female end segment 38 may be oriented upwardly to create a joint capable of entrapping condensation flowing down the chimney toward the burner.

FIG. 4 shows a coupling 56 for use in connection with a treble pipe chimney. The coupling 56 is shown assembled with a treble pipe chimney section 20 in FIG. 1. As previously discussed, multi-pipe sections may be used to pass flammable building members as well as for built-in fireboxes having enclosed chimneys or flues.

Coupling 56 is shown to comprise three separate coaxial rings 60, 62 and 64. Ring 64 is oriented inversely with respect to rings 60 and 62 so as to cause the drainage of the center tube to be into the firebox.

The rings 60, 62 and 64 are held in spaced relation to one another by a plurality of S-shaped spacers 66. The spacers 66 and rigid members which extend radially or normally from intermediate ring 62 into contact with rings 60 and 64. The spacers 66 have three distinguishable portions; portion 66A which extends normally between rings 62 and 60; portion 66B which is substantially perpendicular to portion 66A and conforms to the contour of ring 62 to which it is securely affixed by rivet 68; and portion 66C which continues from portion 66B and extends normally between rings 62 and 64. To allow the passage of portion 66C through the wall of ring 62, the ring is provided with a plurality of circumferentially distributed slots 70 designed for that purpose.

This multi-ring coupling grants several advantages over prior art devices. The manufacture of multi-pipe chimney sections is greatly expedited because the need to provide spacers between the individual pipes in the course of manufacture is obviated. Spacing is now provided by the multi-ring coupling. With this advantage, the constituent members of the multi-pipe sections can be taken to the job site separately where they may be cut and fitted individually by the assembler. Thus, the entire assembly procedure can be handled in a manner that is less awkward and cumbersome than that known with the use of prior art devices.

To those skilled in the art to which the invention relates, many changes in construction and widely varying embodiments and applications of the invention will suggest themselves without departing from the spirit and scope of the invention. The disclosure and description herein are purely illustrative and are not intended to be in any sense limiting.

The embodiments of the invention in which an exclusive property or privilege is claimed are defined as follows:

1. A coupling for joining metallic circular chimney sections comprising an integral body of thin-gage sheet metal, formed to have first and second circular coaxial end segments joined by a radial step, the first end segment being shaped with an external hem formed by a reversely looped outer end portion sized to receive and engage the inside end of a first adjoining circular metallic chimney section thereover, the second end segment being shaped with an internal hem formed by a reversely looped outer end portion sized to receive and engage the outside end of a second adjoining circular metallic chimney section therein, the first end segment extending radially inwardly of the step whereby said external hem on said first end segment is radially offset with said internal hem on said second segment a distance equal to the thickness of said chimney section mating with said first end segment, and said first and second end segments are thereby radially offset a distance equal to the combined thickness of said chimney section and said reversely looped outer ends whereby said step also providing a common stop for axial travel of the first and second chimney sections when in engagement with the coupling.

2. A coupling as defined in claim 1 wherein the step is smoothly flared inwardly adjacent and contiguous the first end segment to define a radially extending circumferential groove.

3. A chimney for channeling the flow of exhaust gases from a heating fixture comprising, in combination: a coupling for joining first and second metallic chimney sections, the coupling comprising an integral body of thin-gage sheet metal formed to have first and second coaxial end segments joined by a step; the first end segment having an external reversely looped hem and being shaped to receive the end of the first chimney section thereover; the second end segment having an internal reversely looped hem and being shaped to receive the end of the second chimney section therein; the step extending substantially radially from the first end segment to the second end segment, thereby providing a common stop for axial travel of the first and second chimney sections when in engagement with the coupling; the first chimney section having a plurality of circumferentially spaced tabs protruding inwardly from the circumference, the tabs being spaced from one end of the first chimney section substantially the same distance as the distance between the hem on the first end segment and the step of the coupling ring; and, the second chimney section having a plurality of circumferentially spaced tabs protruding outwardly from the circumference, the tabs being spaced from one end of the first chimney section substantially the same distance as the distance between the hem on the second end segment and the step of the coupling ring, thereby allowing the cooperation of the tabs and hems to create a locking relationship among the first and second chimney sections and the coupling.

4. A coupling for joining multi-pipe, metallic chimney sections comprising: a plurality of coaxial rings, each of said rings being characterized by an integral body of thin-gage sheet metal formed to have first and second coaxial end segments joined by a step; each ring having an internal reversely looped hem at one end and an external reversely looped hem at the other end the first step end segments being shaped to receive the ends of a first adjoining multi-pipe section thereover, the second end segments being shaped to receive the ends of a second multi-pipe section therein, the steps providing stops for axial travel of the pipes engaging the rings; and a plurality of spacer means in the form of rigid S-shaped members disposed on a central one of said rings and extending therefrom into contact with each of the inwardly and outwardly adjacent rings to support said rings in spaced relation.

* * * * *